United States Patent [19]

Edwards et al.

[11] 4,108,822

[45] Aug. 22, 1978

[54] CURABLE RESIN COMPOSITIONS

[75] Inventors: Alfred Gerald Edwards, Stourport-on-Severn; Glyn Islwyn Harris, Hagley, both of England

[73] Assignee: Albright & Wilson Ltd., Warley, England

[21] Appl. No.: 604,434

[22] Filed: Aug. 13, 1975

Related U.S. Application Data

[63] Continuation-in-part of Ser. No. 431,828, Jan. 9, 1974, Pat. No. 3,923,721.

[30] Foreign Application Priority Data

Apr. 16, 1975 [GB] United Kingdom ............... 14620/75

[51] Int. Cl.² .................... C08G 61/28; C08G 61/24
[52] U.S. Cl. .................... 260/32.8 R; 260/33.2 R; 260/38; 260/39 SB; 260/839; 260/840; 260/849
[58] Field of Search .................... 260/839, 840, 849, 38, 260/39 SB, 32.8 R, 33.2 R

[56] References Cited

U.S. PATENT DOCUMENTS

| 3,052,640 | 9/1962 | Martin | 260/849 |
|---|---|---|---|
| 3,076,780 | 2/1963 | Barth | 260/840 |
| 3,324,082 | 6/1967 | Sonnabend | 260/849 |
| 3,405,079 | 10/1968 | Huang et al. | 260/849 |
| 3,472,915 | 10/1969 | Rider | 260/840 |
| 3,638,702 | 2/1972 | Endter | 260/839 |
| 3,923,721 | 12/1975 | Edwards et al. | 260/840 |

FOREIGN PATENT DOCUMENTS

| 3,714,247 | 9/1962 | Japan | 260/849 |
|---|---|---|---|
| 4,522,222 | 7/1970 | Japan | 260/849 |
| 4,316,854 | 7/1968 | Japan | 260/849 |
| 1,150,203 | 4/1969 | United Kingdom. | |

*Primary Examiner*—John C. Bleutge
*Attorney, Agent, or Firm*—Flynn & Frishauf

[57] ABSTRACT

Aralkylene-phenol resins may be cured by reaction with 5 - 90% of condensates of formaldehyde and a nitrogen containing compound, e.g. melamine to give cured products having high temperature strength and/or a high comparative tracking index.

21 Claims, No Drawings

CURABLE RESIN COMPOSITIONS

This application is a continuation in part application of an application Ser. No. 431828 filed Jan. 9th 1974, issued Dec. 2, 1975 as U.S. Pat. No. 3,923,721.

The present invention relates to resin compositions and the cured products obtainable therefrom.

British Pat. Specification No. 1150203 describes the production of resins having repeating units of the formula

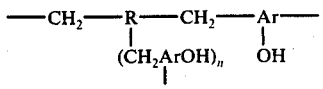

wherein R is an aromatic hydrocarbon or aromatic hydrocarbon-oxyaromatic hydrocarbon group, which optionally has inert substituents and Ar is the residue of a phenolic compound hereinafter defined and $n$ is 0 or 1. These resins can be cured with hexamethylene tetramine.

We have found that the resins can be cured with curable formaldehyde condensates of certain nitrogenous compounds to give cured products having high strength at high temperatures and high resistance to aging at high temperatures.

The present invention provides a resin composition which comprises (a) A resin having repeating units of the formula

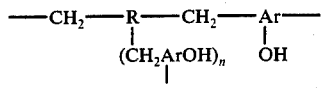

and preferably consists essentially of such repeating units, wherein R is a divalent or trivalent aromatic hydrocarbyl or divalent or trivalent di(aromatic hydrocarbyl) oxy group, which optionally has at least one inert substituent and Ar is a residue formed by removal of two nuclear hydrogen atoms from a phenolic compound having 1 - 3 hydroxyl groups and at least two nuclear hydrogen atoms, and $n$ is 0 or 1, and (b) a formaldehyde condensate formed from formaldehyde (or a compound yielding it in situ such as paraformaldehyde or hexamethylene tetramine) and a nitrogenous compound containing a group

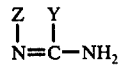

or a group enolizable to said group, wherein Y represents an oxygen, sulphur or nitrogen atom, and Z represents a hydrogen, carbon or oxygen atom or Y and Z together form a direct bond, said condensate containing at least two hydroxy methyl groups per molecule, attached to nitrogen atoms being in an uncured or partially cured form and providing 5 - 90% by weight of the total weight of resin and condensate.

An inorganic dispersing agent is usually added to solutions of resin (a) and condensate (b) when the latter is insoluble in the solution. The dispersing agent enables the condensate to be well dispersed and hence enables cured products with more uniform properties to be obtained, eg. more even impregnation of a cloth leading to a high quality laminate.

The nitrogenous compound is preferably of formula

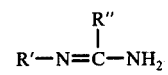

wherein R' is a hydrogen atom, R" is a hydroxyl or thiol group or a group of formula NR'''R'''', in which each of R''' and R'''', which are the same or different, is a hydrogen atom alkyl group of 1 - 6 carbon atoms, a phenyl group or cyano group, or R' and R" together represent a direct bond or a group of formula

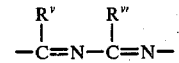

wherein each of R$^v$ and R$^{vi}$, which are the same or different, is a hydroxyl or thiol group or a group of formula NR'''R''''.

Thus when R' is hydrogen atom, R" may be a hydroxyl group (as in urea), a thiol group (as in thiourea), an amino group (as in guanidine), or cyanoamino group (as in dicyandiamide). When R' and R" together represent a direct bond, the compound is cyanamide. When R' and R" together represent the group of the formula

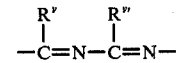

the nitrogenous compound is an aminotriazine, such as melamine.

The nitrogenous compound is preferably melamine or urea, but especially melamine.

The condensates, which are in the uncured or partially cured form are well known and are described in, for example, "Aminoplastics" by C. P. Vale, published by Cleaverhulme Press, London, 1950. They are preferably made by reaction of one molar proportion of the nitrogenous compound with 1.2 - 10 molar proportions of formaldehyde (or less preferred, the equivalent amount of formaldehyde yielding compound), especially 1:2 to 1:8 molar proportions, in neutral or alkaline conditions. The condensate is uncured or partially cured, usually with not more than five repeat units derived from the nitrogenous compound. Preferably it is uncured with 1 structural unit derived from the nitrogenous compound and at least two hydroxymethyl groups attached to nitrogen atoms. The two hydroxymethyl groups may be attached to the same or different nitrogen atoms. Preferably the condensate contains hydroxy methyl groups attached to nitrogen atoms in an average number from two (and preferably from 2.5) to the maximum number of hydrogen atoms attached to nitrogen atoms in the nitrogenous compound from which the condensate is made. Thus when the nitrogenous compound is urea, the condensate preferably contains 2 - 4 hydroxymethyl groups and one urea structural unit. When the nitrogenous compound is melamine the condensate preferably contains 2 - 6, usually an average of 2.5 - 6, and especially 3 or 6 (as in trimethylolmelamine and hexamethylolmelamine) hydroxymethyl groups. An average of 2.5 hydroxy methyl groups per molecule of nitrogenous compound means that, for example, the condensate is a 1:1 molar mixture of a condensate with 2-, and a condensate with 3- hydroxymethyl groups per molecule of nitrogenous compound.

The amount of formaldehyde condensates may be 5 – 55%, e.g. 5 – 50% and especially 5 – 40% by weight of the total weight of resin and condensate. Amounts of 15 – 35%, and 18 – 30% are preferred as these amounts give cured products with high strength at high temperatures and increased retention of strength after aging at high temperatures; amounts of about 25% of condensate are especially preferred. It has also been found that cured products with these improved properties can be obtained when the ratio of the average number of structural units in the resin derived from the phenol multiplied by the weight of resin to the number of structural units in the condensate derived from the nitrogenous compound, multiplied by the weight of the condensate (hereinafter referrred to as the phenol:nitrogenous ratio) is in the region 2:1 to 16:1, and especially 2.8:1 to 8:1.

The amount of formaldehyde condensate may also be 55 – 90% by weight of the total weight of resin and condensate. Amounts of 58 – 74%, e.g. 60 – 70% are preferred for some uses as these amounts give cured products with high strength at high temperatures and moderate retention of strength after aging at high temperatures but coupled with a moderate comparative tracking index. Amounts of 74 – 90%, e.g. 80 – 90%, are used if a much higher comparative tracking index of the cured products is wanted. The cured products with good comparative tracking index may be used in electrical insulation, e.g. in insulators for external uses or in electrical motors.

The resin composition may also contain 0.5 – 100% by weight (based on the weight of the resin) of an inorganic dispersing agent having at least 1 dimension less than 100 m$\mu$ and all dimensions less than 15 $\mu$, and stable to at least 150° C, and/or a particulate material of particle size 0.2 $\mu$ – 2 mm, preferably 1$\mu$ – 1 mm, and stable to at least 150° C which is preferably at least one of a flame retardant, lubricant, and metal powder. The formaldehyde condensate may also have this particle size. The particle size of 0.2 $\mu$ – 2 mm means that there are substantially no particles with any dimension less than 0.2 $\mu$ or more than 2 mm. The composition comprising resin and as dispersing agent, finely divided silica of particle size 1 – 80 m$\mu$, can be used with the condensate as curing agent and optionally the particulate material to prepare a coating solution, which after application, evaporation of solvent and heating/curing, produces a coated layer in which the problem of cissing is greatly reduced, if not eliminated. Cissing is a well known surface coating pehnomenon (see eg. "Paint Film Defects," Manfred Hess, published by Chapman and Hall, 2nd edition, 1965, p. 436) and is associated with non-wetting of the surface being coated.

The compositions of the invention comprising resin, the dispersing agent and curing agent and optionally the particulate material, can be cured with decreased production of blisters in the cases when volatile materials are produced on curing, as in this case, and thus can be used as adhesives with high adhesive strength.

We have also found that the composition comprising resin, dispersing agent and particulate material can be treated with solvent to provide a dispersion, in which the particulate material is well dispersed and hence enables cured products with more uniform properties to be obtained, eg. more even impregnation of a cloth leading to a high quality laminate.

The amount of inorganic dispersing agent is usually 0.5–20% (by weight based on the weight of the resin) when the resin composition is to contain the condensate in solution and to be used for producing coatings showing reduced cissing or for adhesives showing in the cured form reduced blistering, preferred amounts being 1 – 10% in both cases. When the resin composition also contains the particulate materials, whether the condensate is or is not to be in solution, an amount of 0.5 – 100% (based on the weight of the resin) of dispersing agent is used, the higher values being appropriate when the dispersion of resin, dispersing agent and particulate material is to be used as a "masterbatch" for subsequent dilution with further resin solution; amounts of dispersing agent in the region 1 – 20% are preferred when the resin dispersion is to be used as such.

The amount of particulate material (apart from the condensate) in the resin composition is usually 1 – 100% (by weight of the resin), the higher values again being used when the composition is to be used as a masterbatch for subsequent dilution with more resin solution. Amounts of particulate material in the range 1 – 30% are suitable for dispersions to be used as wuch, the preferred upper limit being dependent on the nature of the particulate material. The usual amounts of antimony oxide, chlorine and/or phosphorus containing organic flame retardants and metal powders are respectively 5%, 10% and 25%.

In the dispersions of the invention comprising resin, dispersing agents and particulate material and condensate, the amount of dispersing agent depends on the nature and amount of the solvent and particulate material, and on the degree of dispersion required.

The inorganic dispersing agent, which is stable to at least 150° C, preferably to at least 200° C, usually has a minimum dimension of at least 1 m$\mu$. It is preferably finely divided silica of average particle size 3 – 80 m$\mu$, especially 7 – 40 m$\mu$, eg. the fumed colloidal silica sold under the trade names Aerosil and Cabosil, finely divided Chrysotile asbestos, eg. of diameter about 25 m$\mu$ and length 5 – 10 $\mu$, such as that sold under the trade name Sylodex which may optionally be mixed with silica, and finely divided hydrous magnesium aluminium silicates, eg. organic derivatives of mont-morillonite with a platelike structure of thickness 2 – 4 m$\mu$ and maximum dimension 0.5 – 1 $\mu$, such as that sold under the trade name Bentone.

Examples of the flame retardants are organic compounds containing halogen and/or phosphorus atoms, such as polyhalogenated organic compounds, preferably those in which the halogen is chlorine or bromine, and especially those in which the organic nucleus is an aromatic nucleus, eg. decachlorobiphenyl, hexabromobenzene, hexachlorobenzene and tetrabromobisphenol A, and tris (bromopropyl) phosphate, tris (pentabromophenyl) phosphate and tris (dichloropropyl) phosphate. These compounds, which may be soluble in the resin solution, are used in conjunction with antimony oxide, which is insoluble. Other flame retardants are metal borates, eg. borates of metals of Gp. 2 (of the Periodic Table, published in Bull. Soc. Chim. France, January 1966) such as zinc, calcium or barium. Antimony oxide may also be present in admixture with the borates.

The lubricant particulate materials may be homo polymers of tetrafluoroethylene (PTFE) and copolymers thereof with other fluorinated olefins of 3 – 6 carbon atoms, eg. perfluoropropylene, or may be inorganic in nature, such as graphite, molybdenum disulphide or metal salts of fatty acids of 8 – 20 carbon atoms, eg. stearic acid, zinc and calcium stearates being preferred. Incorporation of the lubricant in the resin composition enables cured products, eg. bearings having a low coefficient of friction to be obtained.

The metal powder, that may also be the particulate material, may be aluminium powder or zinc dust. Metal powders are generally used when the resin, dispersing agent and metal powder is for use in surface coating applications, but could be used for producing laminates.

The resin is perferably prepared as described in British patent Specification No. 1150203, by reacting (1) an aralkyl ether of the general formula $R(-CH_2OR^2)_a$ and/or an aralkyl halide of the general formula $R-(CH_2X)_a$, wherein R is a divalent or trivalent aromatic hydrocarbyl or aromatic hydrocarbyloxy-aromatic-hydrocarbyl radical, R optionally containing inert substituents in the aromatic nucleus, $R^2$ is an alkyl radical containing 1–5 carbon atoms, X is chlorine, bromine or iodine and $a$ has a value of 2 or 3 with (2) a molar excess, normally of at least 1.3 : 1, preferably in the range of 1.4 : 1 to 2.5 : 1 of a phenolic compound or a phenolic compound and a non phenolic compound containing an aromatic nucleus. If a is 3, then n is 1 and a further ArOH group may be bonded to R through another methylene bridge.

In these general formulae R represents any divalent or trivalent aromatic hydrocarbyl or aromatic - hydrocarbyloxy - aromatic - hydrocarbyl radical (alternatively described as a di(aromatic hydrocarbyl) oxy radical), for example the m - or p-phenylene radical, the diphenylene radical, the diphenylene oxide radical,

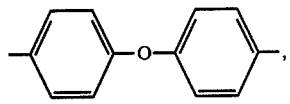

the radical

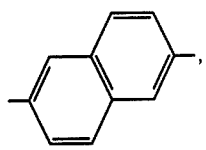

or the radical

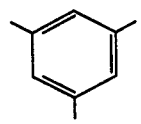

Thus both mono nuclear, and fused and unfused di- and poly nuclear radicals may be represented by R, though mononuclear radicals are preferred because the cured products therefrom have higher strength at high temperatures than those from di and polynuclear radicals. Preferably R does not represent a diphenylene or diphenylene oxide radical when the aralkyl halide is used to prepare the resin. The resin is preferably prepared from the aralkyl ether, especially ones in which $R^2$ is an alkyl radical of less than four carbon atoms, eg. a methyl radical. The preferred compounds for reaction with the phenolic compounds are those in which a has a value 2, particularly the p-xylylene dihalides, for example p-xylylene dichloride and the p-xylylene dialkyl ethers, for example p-xylylene - glycoldi-methylether.

If desired the R radical may contain at least one substituent attached to the aromatic nucleus, which substituent is an alkyl group of 1 to 6 carbon atoms, eg. a methyl group, a phenyl group or a halogen atom, eg. a chlorine or bromine atom. These substituents are inert under the conditions of the reaction. In fact the presence of chlorine or fluorine atoms in some or all of the available positions in the aromatic nucleus has been found advantageous in that it leads to improved flame resistance in the resulting polymeric products. Examples of such substituted aralkyl ethers and aralkyl halides, which may be employed according to this invention, are 2, 3, 5, 6 - tetrachloro - 1, 4 - di (chloromethyl) benzene and 2, 3, 5, 6 - tetrachloro - 1, 4 - di(methoxymethyl) - benzene.

The phenolic compound includes any compound or mixture of compounds derived from benzene and containing 1 to 3, preferably 1 or 2, hydroxyl radicals joined to the aromatic nucleus, there being a total of not more than 3 substituents attached to ring carbon atoms of the benzene nucleus apart from the one essential hydroxyl group. Thus the phenolic compounds may be of formula

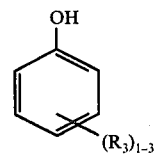

where each $R_3$ is hydrogen, hydroxyl, alkyl or 1 to 8 carbon atoms, eg. methyl, ethyl, isopropyl, tertiary butyl or tertiary octyl, phenyl and hydroxyphenylalkyl, eg. hydroxy phenyl - methylene, - ethylene and - isopropylidene. Examples of these phenolic compounds are phenol, p - cresol, m - cresol, resorcinol, catechol, 4 - methylcatechol, isopropyl catechol, diphenylol propane (bis 2,2- (4-hydroxy phenyl) propane), diphenylolethane, monoalkyl phenols such as p-ethylphenol, p-tertiary butyl phenol and p-tertiary octyl phenol, m - and p - phenyl phenol, pyrogallol and phloroglucinol. Preferably the phenol contains only one benzene ring. Mixtures of the phenols can be used such as a monophenol with a dihydric phenol, eg. resorcinol with phenol itself, or mixtures of diphenols, eg. 4-methyl catechol and catechol and/or resorcinol, such as that sold as a phenolic coal tar fraction.

Examples of the compound containing aromatic nuclei which may be mixed with the phenolic compound in the formation of the resin are diphenyl - or dibenzyl - ether, terphenyl, diphenyl - amine, diphenyl sulphide, diphenyl anthracene, diphenyl sulphone, triphenyl phosphate, octaphenylclotetrasiloxane, aryl substituted borazoles and metal complexes such as ferrocene. The proportion of aromatic compound can vary within wide limits but is not sufficient to prevent satisfactory curing of the reaction product with the hardening agent. Further details of the aromatic compound and its mode of use in the reaction of phenol and dihalide or diether are given in British Patent Specification No. 1150203.

When the composition comprising resin (a) and condensate as curing agent is to be used as a moulding powder, the components can be dry mixed, or melted together, before being formed into a moulding powder and subsequently moulded under heat and pressure to form cured moulded articles. When the composition comprising resin (a) and condensate as curing agent is to be used for coating purposes or for impregnation in the production of laminates and the solvent used is one in which the condensate is insoluble, it is preferred but not essential, to incorporate the inorganic dispersing agent as well so that the liquid dispersion used for coating or impregnation may be as uniform as possible.

The compositions of this invention may also contain inorganic fillers, eg. asbestos flour, mica or chopped glass strands. The inorganic filler and resin will normally be present in a weight ratio of 0.05 : 1 to 4.0 : 1. Other ingredients such as pigments, accelerators, and antistaining agents, eg. magnesium oxide, or titanium dioxide may also be present if desired.

The compositions of the invention can be made by mixing the various components in any order, but it is convenient to add the curing agent last. The mixing can be carried out in any convenient method such as dry blending to form a powder for moulding (optionally with subsequent addition of organic solvent to make the desired liquid for coating and impregnating purposes) or blending in solutions in an organic solvent to prepare the liquid directly. The solvent may be a dialkyl ketone of 3 – 8 carbon atoms eg. methyl isobutyl ketone, methyl ethyl ketone, or methylisoamyl ketone, isophorone, diacetone alcohol, a cycloalkyl ketone of 5 – 7 carbon atoms, eg. cyclohexanone, an alkoxy alkanol with 1 – 6 carbon atoms in the alkoxy group and 2 – 7 carbon atoms in the alkanol group, such as 2 - ethoxyethanol, alkyl ethers thereof with 1 – 6 carbon atoms in the alkyl group, eg. the methyl ether, esters of the alkoxy alkanols with alkanoic acids of 2 – 6 carbon atoms, eg. the acetate, any of which solvents can be (in an amount sufficient to maintain the resin in solution) mixed with an aromatic hydrocarbon, preferably a monocyclic one of 6 – 12 carbon atoms such as benzene, toluene or xylene or an aliphatic hydrocarbon such as white spirit or solvent naphtha or an alkanol, eg. of 1 to 6 carbon atoms, such as methanol, ethanol or n-butanol. Preferably the solvent chosen is one in which the condensate is soluble, eg. an alkoxy alkanol as above and preferably 2 - ethoxy ethanol. The resin is usually present in the organic solvent solutions in an amount of 5 – 90%, preferably 20 – 65%, eg. 20 – 50% by weight. The mixing is usually carried out at a low temperature, eg. 20° – 30° C and the mixture stored until required; preferably the resin and condensate each in solution are mixed together.

The liquid mixture of resin, curing agent, dispersing agent (if present) and solvent (and other additives if present) can be used as a coating solution or as an impregnant for the production of laminates. The solvent from the liquid dispersed mixture can also be evaporated and the residual product used as a moulding powder; this technique is preferred for the production of moulding powders containing long fibres, which may be broken in the dry mixing method.

The compositions of the invention are cured by heating, usually at above 70° C and preferably 100° – 180° C, eg. 150° – 180° C. Post curing may also be carried out, usually initially at 60° – 100° C for 4 – 24 hours, and then at 160° – 250° C. The time needed for post curing varies according to the properties of the desired product, and the temperature of use of that product; examples of times of curing at 100° – 180° C are 0.5 – 48 hours, eg. 0.5 – 10 hours at 150° – 180° C.

For the use of the compositions of the invention for coating, the mixture of resin, dispersing agent (if present), curing agent and solvent (together with any other additives) can be applied by any means to the surface to be coated, eg. by painting, spraying or immersion. Normally the surface will be of metal, eg. ferrous metal such as mild steel, but other substrates such as wood, plastic material or inorganic materials such as porcelain or cement can be coated, if desired. After coating the solvent is evaporated and the layer cured. When the dispersing agent is finely divided silica, the cured layer shows little or no "cissing."

Compositions of the invention may also be used as adhesives and then the mixture of resin, dispersing agent, curing agent and solvent, (together with any other additives) can be applied to one or both of the surfaces to be adhered together by any means, eg. painting, spraying or immersion. Examples of suitable surfaces are those of metals, eg. ferrous metal such as mild steel but other substrates such as plastics materials eg. those described in British Patent 1150203, optionally with reinforcement eg. glass or asbestos fibres, or inorganic materials such as porcelain or cement can be used. After the applications, the solvent is evaporated, the surfaces brought together and the combination of surfaces and intervening layer cured.

In the use of the compositions of the invention for making laminates, the liquid mixture is applied to the laminate base. Suitable laminate bases are glass cloth or carbon fibre agglomerates although other fibrous materials such as asbestos cloth may also be employed if desired. Such materials are impregnated with the dispersed mixture as described above and then dried. Typically the fibrous base is passed through a bath of the resin dispersion.

The fibrous material into which the resin has been impregnated is usually then subjected to a precure heat treatment at 100°–160° C, often at 130°–140° C for 5–20 minutes, eg. for about 10 minutes. In the prepregs formed the resin and condensate have partly reacted. A stack of the prepregs is then pressed at a temperature above 160° C, often in the range 170°–190° C at a pressure of from 100–1500 psi, although pressure above 500 psi, often of about 1,000 psi are normally employed. Normally pressing will be carried out for a period of at least 1/2 hour, and generally up to 2 hours, often for about an hour, depending upon the conditions of temperature and pressure employed.

For optimum results the laminates are subsequently post cured, eg. by heating outside the press (as in air circulating oven). The temperature and time employed for the post cure operations are dependent upon each other, and on the use of the product and the degree of post cure. Usually the post cure is at 60°–100° C for 4–24 hours, eg. for 12–24 hrs at 80°–100° C, and then for at least 3 hours, and often 4–48 hrs, at a temperature of 140°–250° C, often raising the temperature from a value in the range 140°–180° C to a value in the range 190°–250° C during that time. A post cure in the temperature range 140°–190° C may take 5–7 hours, whereas one in the range 220°–250° C may be accomplished in 3–5 hours. However it is normally desirable that the material is heated to a temperature in the range 190°–220° C.

The invention is illustrated in the following Examples:

EXAMPLE 1.

RESIN A. — An aralkylene phenol resin was made by reacting 705 g (7.5 moles) of phenol and 830 g (5 moles) of p-xylylene dimethyl ether (technical grade) in the presence of 1 ml. of diethyl sulphate as catalyst. On heating to 130°-200° C methanol was liberated and distilled out. The product on cooling was a red brown solid having a softening point of 97° C.

RESIN B. — 126 g (1 mole) of melamine and 225 mls (3 moles) of a 40% formalin solution were mixed together and a few drops of dilute sodium hydroxide were added to make the mixture slightly alkaline. The resultant solution was heated to 75° C with stirring and on cooling, a white precipitate was formed. This was filtered off and dried to obtain a white powder, nominally trimethylol melamine.

7.5 grams of resin A were mixed thoroughly with 2.5 grams of Resin B. The mixture was put into an aluminium dish and placed in an oven at 200° C. A hard infusable, insoluble mass was formed.

240 grms. of resin A were dissolved in a mixture of 240 grms. of ethyl methyl ketone and 80g of industrial methylated spirits. To this solution was added 80 grms of resin B and 6 grms of fumed silica, and these were dispersed using a high speed mixer. The resultant mixture was used to impregnate glass cloth (Marglass 116T/P705) and the pre-preg produced was precured for 10 minutes at 135° C. This was cut into 10 × 10 inch squares and pressed into a laminate at 175° C/1000 psi for one hour. The laminate produced was post cured from 140°-250° C over 23 hours and had the following flexural strengths.

Flexural measured strength at

| 20° C | 81,200 psi |
|---|---|
| 150° C | 38,200 psi |
| 200° C | 18,600 psi |
| 250° C | 14,500 psi |

The phenolic:nitrogenous ratio is 2.5:1

EXAMPLE 2

RESIN C. — 126 gms (1 mole) of melamine and 236 mls. (3 moles) of 38% formaldehyde solution were mixed together in a flask with 4 mls. of 0.880 ammonia solution. They were heated to reflux at about 75° C and after approximately 5 minutes the mixture cleared. Following a further 12 minutes reflux 360 gms. of 2 - ethoxy ethanol were added and the resulting product was cooled to give a clear solution.

The following solution formulations were prepared.

|  | A | B | C |
|---|---|---|---|
| Resin from p-xylylene dimethyl ether (tech) and phenol. Softening point 88° C. (prepared as described in BP1150203). | 200g. | 200g. | 200g. |
| Resin C solution. | 68g. | 136g. | 204g. |
| Ethyl methyl ketone | 200g. | 160g. | 120g. |
| The phenolic:nitrogenous ratio is | 13:1 | 6.5:1 | 4.37:1 |

These three solutions were used to impregnate Marglass 116T/P734 glasscloth which was then precured for 10 minutes at 130° C. The impregnated cloth was then cut into squares and 12 pieces in each case were pressed together for an hour at 175° C and 1,000 psi to give laminates having resin contents of 31.8%, 35.7% and 33.8% respectively.

The three laminates were post cured from 175° to 250° C over a period of 24 hours and their flexural strengths then measured with the following results.

|  | Flexural strength in psi measured at given temperature | | |
|---|---|---|---|
|  | 20° C | 150° C | 200° C |
| Laminate from formulation A. | 83,600 | 7,700 | 4,900 |
| Laminate from formulation B. | 77,200 | 17,600 | 9,900 |
| Laminate from formulation C. | 70,700 | 42,200 | 22,300 |

EXAMPLE 3

RESIN D — 744 gms, (6 moles) of technical grade 4 methyl catechol and 664 gms. (4 moles) of technical p-xylylene dimethyl ether were reacted together in the presence of diethyl sulphate (5 mls). On heating to 110° C methanol was liberated and this was distilled off while the reaction temperature was being increased to 175° C. The last traces of volatile materials were removed under a vacuum of 1 mm of Hg at a temperature of 150° C. A sample of the resin taken at this time had a softening point of 103° C. The resin was then cooled and dissolved in methyl ethyl ketone to give a 60% solution which was dark brown in colour.

Ten grams of the solution of Resin D were mixed with 10 gms. of the solution of condensate Resin C. After removal of the solvent by gentle heating, the residue was heated for 30 minutes at 175° C to give a hard infusible, insoluble product. The phenolic:nitrogenous ratio was 3.77:1.

EXAMPLE 4

RESIN E. — The process of making the solution of Resin C in Example 2 was repeated, but using 126 gms. (1 mole) of melamine, 158 gms. (2 moles) of 38% formaldehyde solution, and diluting at the end with only 250 gms. of 2 - ethoxy ethanol.

10 gms. of the solution of Resin D were mixed with 10 gms. of the solution of condensate Resin E. After removal of the solvent by gentle heating, the residue was heated for 30 minutes at 175° C to give a hard infusible insoluble product. The phenolic:nitrogenous ratio was 2.76:1.

EXAMPLE 5

CONDENSATE RESIN F. — 60 gms. (1 mole) of urea and 163 gms. (2.1 moles) of formaldehyde were mixed together and the pH of the resulting solution was adjusted with dilute ammonia solution to between 7 and 8. The mixture was then left at room temperature for 24 hours and the dense white solid formed was then filtered, washed with ethanol and dried. The solid is nominally dimethylol urea.

Ten grams of the solution of Resin D were thoroughly mixed with 2 gms. of condensate Resin F. After removal of the solvent by gentle heating, the residue was heated for 30 minutes at 175° C, when a hard, insoluble, infusible mass was formed. The phenolic:nitrogenous ratio was 5.56:1.

EXAMPLE 6

RESIN G. — 55 gms. (0.5 mole) of resorcinol, 235 gms. (2.5 moles) of phenol and 332 gms. (2 moles) of technical p-xylylene dimethyl ether were reacted together using 2 gms. of copper sulphate as the catalyst.

On heating to 128° C methanol was liberated and was distilled out of the mixture. This distillation was continued while the temperature was slowly raised to 180° C. When all the methanol had been removed the resin formed was poured into a tray and allowed to cool. The product was a hard brittle, dark red solid having a softening point of 96° C.

Ten grams of Resin G were dissolved in 5 gms. of methyl ethyl ketone and mixed with 10 gms. of the solution of Resin condensate C (in Example 2). After removal of the solvents by gentle heating the residue was heated for 30 minutes at 175° C to form a hard infusible, insoluble mass. The phenolic:nitrogenous ratio was 4.85:1.

EXAMPLE 7

CONDENSATE RESIN H. — 378 gms (3 moles) of melamine were added to 772 gms (9 moles) of a 38% w/v formaldehyde solution and the resultant mixture was heated until a clear solution of trimethylol melamine was obtained at about 70° C. At this point 1150 gms of 2-ethoxyethanol were added with stirring and the solution was cooled.

The following solution formulations were prepared.

|  | D | E | F | G | H |
|---|---|---|---|---|---|
| Aralkyl-phenol resin (as in Example 2) | 400g | 400g | 350g | 300g | 300g |
| Solution of Resin H | 136g | 272g | 357g | 438g | 510g |
| 2-ethoxyethanol | 400g | 320g | 210g | 120g | 60g |
| concentration of tri-methylol melamine (based on the weight thereof + weight of resin) | 8.75% | 16.1% | 22.3% | 29.2% | 32.4% |
| phenolic: nitrogenous r. | 14:1 | 7:1 | 4.65:1 | 3.26:1 | 2.8:1 |

The solutions D to H were impregnated into Marglass 116T/P705 glasscloth and then the impregnated glasscloth precured at a temperature at 130° C for 10 minutes. Laminates (D - H) were made from the prepreg produced by pressing for 1 hour at 175° C and 1000 psi, and then post curing in an air circulating oven for 16 hours. at 90° C and 6 hours from 140°-200° C. The resin contents of the laminates prepared in this way were 34.0%, 33.0%, 35.2%, 39.1% and 39.5% for D - H respectively.

After post curing, flexural strength measurements were made on the laminates at about 20°, 150° and 200° C before and after heat aging at 200° C. The results obtained were as follows.

| | Flexural strengths measured at about 20° C in psi. | | | | |
|---|---|---|---|---|---|
| | D | E | F | G | H |
| initial | 87,900 | 92,700 | 77,300 | 64,200 | 57,500 |
| after 24 hrs at 200° C. | 89,700 | 90,800 | 76,400 | 64,000 | 55,400 |
| after 48hrs at 200° C. | 88,500 | 88,000 | 77,400 | 70,600 | 59,400 |
| after 100hrs at 200° C. | 88,400 | 99,200 | 87,500 | 66,700 | 52,600 |
| after 250hrs at 299° C. | 94,200 | 94,900 | 80,700 | 76,000 | 40,400 |
| after 500hrs at 200° C. | 78,700 | 78,200 | 74,100 | 65,800 | 45,100 |
| after 750hrs at 200° C. | 90,800 | 92,900 | 81,400 | 80,100 | 20,700 |
| after 1000hrs at 200° C. | 86,300 | 95,200 | 73,900 | 76,100 | 26,200 |

| | Flexural strengths measured at 150° C in psi. | | | | |
|---|---|---|---|---|---|
| | D | E | F | G | H |
| initial | 4,700 | 16,500 | 25,400 | 31,800 | 46,700 |
| after 24hrs at 200° C. | 8,700 | 26,200 | 43,400 | 46,300 | 48,300 |
| after 48hrs at 200° C. | 8,300 | 28,700 | 43,000 | 53,100 | 52,800 |
| after 100hrs at 200° C. | 10,700 | 35,500 | 48,400 | 52,700 | 50,800 |
| after 250hrs at 200° C. | 10,400 | 47,800 | 55,500 | 54,400 | 34,800 |
| after 500hrs at 200° C. | 11,500 | 47,300 | 53,800 | 50,700 | 36,300 |
| after 750hrs at 200° C. | 20,300 | 56,400 | 58,700 | 54,000 | 29,200 |
| after 1000hrs at 200° C. | 20,800 | 58,700 | 58,000 | 57,400 | 24,500 |

| | Flexural strength in psi measured at 200° C. | | | | |
|---|---|---|---|---|---|
| | D | E | F | G | H |
| initial | 3,600 | 6,800 | 11,800 | 23,500 | 27,800 |
| after 24hrs at 200° C. | 7,600 | 15,400 | 17,100 | 38,800 | 51,500 |
| after 48hrs at 200° C. | 7,600 | 15,500 | 16,400 | 33,000 | 48,800 |
| after 100hrs at 200° C. | 9,000 | 17,700 | 20,200 | 44,700 | 49,900 |
| after 250hrs at 200° C. | 10,200 | 23,600 | 37,700 | 47,700 | 31,200 |
| after 500hrs at 200° C. | 8,000 | 24,400 | 40,200 | 47,800 | 28,700 |
| after 750hrs at 200° C. | 9,600 | 39,400 | 43,900 | 48,100 | 21,200 |
| after 1000hrs at 200° C. | 10,800 | 30,600 | 49,200 | 50,300 | 20,600 |

These results show that the laminates having the highest strengths at high temperatures and resistance to aging are laminates F and G, with laminate E the next best.

EXAMPLE 8

CONDENSATE RESIN J. — 189 gms (1.5 moles) of melamine were mixed with 772 gms (9 moles) of a 38% formaldehyde solution and the resultant mixture was warmed to about 70° C until a clear solution was obtained. 2-ethoxy ethanol (961 gms) was added with stirring and the solution was cooled. The solution contains a product which is nominally hexmethylol melamine.

The following solution formulations were prepared.

| | J | K | L | M | N |
|---|---|---|---|---|---|
| Aralkyl-phenol resin (as in Example 2) | 400g | 400g | 350g | 300g | 300g |
| Solution of Resin J. | 136g | 272g | 357g | 438g | 510g |
| 2-ethoxy ethanol | 400g | 320g | 210g | 120g | 60g |
| Concentration of hexamethylol melamine (based on the weight thereof + weight of resin. | 7.5% | 14.0% | 19.5% | 25.8% | 28.8% |
| Phenolic:nitrogenous ratio | 23.3:1 | 11.7:1 | 7.75:1 | 5.42:1 | 4.65:1 |

Laminates were prepared from these solutions as described in Example 7. The resin content of the laminates obtained were 33.0%, 38.4%, 34.0%, 36.6% and 39.0% for laminates J to N respectively.

Flexural strength measurements on the laminates were again made at about 20°, 150° and 200° C before and after heat aging at 200° C.

| | Flexural strengths in psi measured at about 20° C. | | | | |
|---|---|---|---|---|---|
| | J | K | L | M | N |
| initial | 69,700 | 86,300 | 70,000 | 73,500 | 64,300 |
| after | | | | | |

-continued

| | | | | | |
|---|---|---|---|---|---|
| 24hrs at 200° C. after | 88,300 | 86,500 | 72,800 | 67,400 | 59,600 |
| 48hrs at 200° C. after | 82,900 | 94,600 | 82,700 | 73,600 | 63,000 |
| 100hrs at 200° C. after | 80,400 | 92,900 | 69,800 | 69,300 | 60,100 |
| 250hrs at 200° C. after | 102,700 | 96,600 | 73,500 | 80,000 | 57,000 |
| 500hrs at 200° C. after | 78,500 | 79,300 | 68,100 | 64,200 | 40,400 |
| 750hrs at 200° C. after | 80,500 | 92,700 | 65,200 | 62,000 | 44,700 |
| 1000hrs at 200° C. | 82,200 | 78,400 | 65,600 | 62,800 | 43,300 |

| | Flexural strengths in psi measured at 150° C. | | | | |
|---|---|---|---|---|---|
| | J | K | L | M | N |
| initial | 3,100 | 14,300 | 17,000 | 30,100 | 34,700 |
| after 24hrs at 200° C. | 6,600 | 21,300 | 44,600 | 49,700 | 50,500 |
| after 48hrs at 200° C. | 12,100 | 23,300 | 49,700 | 55,500 | 52,000 |
| after 100hrs at 200° C. | 10,900 | 28,000 | 49,400 | 54,000 | 54,000 |
| after 250hrs at 200° C. | 16,300 | 40,600 | 54,800 | 60,200 | 50,800 |
| after 500hrs at 200° C. | 16,000 | 49,000 | 52,700 | 54,000 | 41,300 |
| after 750hrs at 200° C. | 18,200 | 48,400 | 52,700 | 55,200 | 36,800 |
| after 1000hrs at 200° C. | 18,400 | 52,600 | 53,500 | 51,900 | 38,500 |

| | Flexural strengths in psi measured at 200° C. | | | | |
|---|---|---|---|---|---|
| | J | K | L | M | N |
| initial | 1,300 | 11,100 | 9,700 | 13,400 | 29,100 |
| after 24hrs at 200° C | 6,700 | 11,600 | 16,400 | 35,000 | 49,700 |
| after 48hrs at 200° C | 9,200 | 15,200 | 22,000 | 44,200 | 53,900 |
| after 100hrs at 200° C | 9,800 | 15,400 | 29,100 | 48,500 | 54,800 |
| after 250hrs at 200° C | 8,900 | 18,900 | 39,400 | 52,000 | 49,400 |
| after 500hrs at 200° C | 6,900 | 16,800 | 41,500 | 46,300 | — |
| after 750hrs at 200° C | 9,800 | 25,600 | 46,500 | 54,300 | 40,900 |
| after 1000hrs at 200° C | 11,800 | 28,000 | 46,300 | 48,900 | 42,400 |

Laminates L and M give the best high temperature strengths after heat aging.

EXAMPLE 9

Condensate Resin K 252 g (2 moles) of melamine were added to 429 g (5 moles) of a 38% formaldehyde solution and the resultant mixture was heated until a clear solution was obtained at 70° C. Then, 127 g of 2-ethoxyethanol was added to give a 50% solution of melamine condensate (nominally a mixture of di and tri-methylolmelamines).

The following solution formulations were prepared:

| | P | Q | R |
|---|---|---|---|
| aralkyl-phenol resin (as Example 2) | 250 g | 330 g | 165 g |
| solution of condensate K | 500 g | 330 g | 660 g |
| 2-ethoxyethanol | 365 g | 440 g | 275 g |
| concn. of condensate (based on total wt. of condensate & resin) | 50% | 33.3% | 66.7% |
| The phenolic:nitrogenous ratio | 1.25:1 | 2.5:1 | 1:1.47 |

These solutions were used to impregnate Marglass 116T/P75 glass-cloth and the precure conditions used were:

P — 10 minutes at 120° C
Q — 10 minutes at 125° C
R — 10 minutes at 115° C

Laminates were obtained as described in Example 7, with resin contents of 31.7%, 38.0% and 31.7% respectively for the laminates. They were postcured for 16 hours at 90° C followed by 6 hours from 140°–200° C.

Flexural strengths of the laminates were measured on samples heat aged at 200° C.

| | Flexural strengths at 20° C (psi) | | |
|---|---|---|---|
| | P | Q | R |
| initial | 38,600 | 75,200 | 40,100 |
| after 24 hrs at 200° C. | 40,000 | 72,400 | 32,900 |
| after 48 hrs at 200° C. | 43,000 | 60,000 | 31,900 |
| after 100 hrs at 200° C. | 36,800 | 70,000 | 27,600 |
| after 250 hrs at 200° C. | 20,000 | 65,600 | 17,800 |
| after 500 hrs at 200° C. | 10,000 | 51,700 | 11,000 |
| after 750 hrs at 200° C. | D.L. | 43,500 | 8,900 |
| after 1000 hrs at 200° C. | D.L. | 41,600 | D.L. |

D.L. means delaminated, ie. the sample split, an indication of poor strength.

| | Flexural strengths at 150° C (psi) | | |
|---|---|---|---|
| | P | Q | R |
| initial | 41,500 | 51,400 | 33,700 |
| After 24 hrs at 200° C | 31,600 | 56,600 | 23,200 |
| After 48 hrs at 200° C | 44,600 | 47,700 | 25,300 |
| After 100 hrs at 200° C | 32,200 | 56,900 | 23,000 |
| After 250 hrs at 200° C | 15,500 | 53,800 | 14,400 |
| After 500 hrs at 200° C | D.L. | 41,600 | 10,500 |
| After 750 hrs at 200° C | D.L. | 42,200 | 8,100 |
| After 1000 hrs at 200° C | D.L. | 30,800 | D.L. |

| | Flexural strengths at 200° C (psi) | | |
|---|---|---|---|
| | P | Q | R |
| initial | 39,300 | 26,900 | 26,100 |
| after 24 hrs at 200° C. | 35,200 | 47,300 | 29,600 |
| after 48 hrs at 200° C. | 35,000 | 54,700 | 34,100 |
| after 100 hrs at 200° C. | 32,300 | 54,100 | 23,400 |
| after 250 hrs at 200° C. | 13,800 | 54,500 | 13,800 |
| after 500 hrs at 200° C. | 8,800 | 50,900 | 8,800 |
| after 750 hrs at 200° C. | D.L. | 42,500 | 9,900 |
| after 1000 hrs at 200° C. | D.L. | 32,600 | D.L. |

EXAMPLE 10

Resin L 282 g (3 moles) of phenol were mixed with 249 (1.5 moles) of technical p-xylylene dimethylether in the presence of 0.2 mls of diethyl sulphate as catalyst. The mixture was heated to 135°–180° C and the methanol formed by reaction was distilled out. The product was a red brown semi-solid.

The following solution was prepared:

Solution S

Aralkylphenol resin L — 160 g.
Condensate solution K — 320 g.
2-ethoxyethanol — 188 g.
Phenolic:nitrogenous ratio 1:1.15

This solution was used to impregnate Marglass 116T/P205 glasscloth and a laminate prepared as described in Example 7. There was a precure of 10 minutes at 130° C, the laminate had a resin content of 32.3% and was postcured to 200° C as described previously. The following results for flexural strengths on the laminates heat aged at 200° C were obtained.

| | Flexural strengths (psi) | | |
|---|---|---|---|
| | RT | 150° C. | 200° C. |
| initial | 56,200 | 49,600 | 48,700 |
| after 24 hrs at 200° C | 58,600 | 57,400 | 56,400 |
| after 48 hrs at 200° C | 57,100 | 52,300 | 47,100 |
| after 100 hrs at 200° C | 47,200 | 32,900 | 38,200 |
| after 250 hrs at 200° C | 21,100 | 16,700 | 16,700 |

| | Flexural strengths | (psi) | |
|---|---|---|---|
| | RT | 150° C. | 200° C. |
| after 500 hrs at 200° C | 12,700 | 12,400 | 8,900 |
| after 1000 hrs at 200° C | 11,400 | D.L. | 9,000 |

EXAMPLE 11

The following solutions were prepared:

| | T | U |
|---|---|---|
| Aralkyl phenol resin (as Example 2) | 270 g | 275 g |
| Condensate solution H | 958 g | — |
| Condensate solution J | — | 1152 g |
| Phenolic:nitrogenous r. | 1.33:1 | 1.89:1 |

Thus T contains 1:1 mixture of resin and trimethylolmelamine, and U contains the same ratio of resin to hexamethylolmelamine.

Glasscloth laminates were made as in Example 7 with precuring for:
 10 minutes at 128° C for T and
 10 minutes at 124° C for U The laminates had resin contents of 36.0% and 36.2% respectively and were postcured as described in Example 7. The laminates were heat aged at 200° C and their flexural strengths measured.

| Laminate T | Flexural strengths (psi) | | |
|---|---|---|---|
| | RT | 150° C. | 200° C. |
| initial | 23,300 | D.L. | 23,300 |
| after 24 hrs at 200° C | 34,500 | 28,900 | 23,500 |
| after 48 hrs at 200° C | 22,800 | 21,600 | 25,800 |
| after 100 hrs at 200° C | 17,600 | 18,700 | 19,400 |
| after 250 hrs at 200° C | 14,700 | 12,600 | 10,800 |

| Laminate U | Flexural strengths (psi) | | |
|---|---|---|---|
| | RT | 150° C | 200° C |
| initial | 28,700 | 26,100 | 24,300 |
| after 24 hrs at 200° C | 33,200 | 27,200 | — |
| after 48 hrs at 200° C | 31,600 | 29,400 | 26,300 |
| after 100 hrs at 200° C | 31,000 | 22,300 | 25,300 |
| after 250 hrs at 200° C | D.L. | D.L. | 13,300 |

EXAMPLE 12

The following solutions were prepared:

| | V | W |
|---|---|---|
| Aralkyl phenol resin L | 362g | 181g |
| Condensate solution K | 362g | 724g |
| 2-ethoxyethanol | 436g | 255g |
| Phenolic:nitrogenous ratio | 2.8:1 | 1:1.43 |

These solutions have concentrations of 33.3% and 66.7% of the condensate based on the total solids content. Glasscloth laminates were made from the solutions as in Example 7 with precure conditions of 10 minutes at 134° C for V, and 10 minutes at 140° C for W.

The resin contents of the laminates were 35.0% and 30.0% respectively. The laminates were post cured as described in Example 7. Their flexural strengths after heat aging at 200° C were measured.

| Laminate V | Flexural strengths (psi) | | |
|---|---|---|---|
| | RT | 150° C | 200° C |
| initial | 85,600 | 30,700 | 15,400 |
| after 24 hrs at 200° C | 75,500 | 50,400 | 26,000 |
| after 48 hrs at 200° C | 85,900 | 60,000 | 38,800 |
| after 100 hrs at 200° C | 88,300 | 60,000 | 35,600 |
| after 250 hrs at 200° C | 78,000 | 61,700 | 54,100 |

| Laminate W | Flexural strengths (psi) | | |
|---|---|---|---|
| | RT | 150° C | 200° C |
| initial | 45,000 | 44,200 | 43,200 |
| after 24 hrs at 200° C | 43,600 | 44,500 | 47,600 |
| after 48 hrs at 200° C | 43,500 | 31,400 | 45,200 |
| after 100 hrs at 200° C | 48,800 | 39,000 | 41,300 |
| after 250 hrs at 200° C | 21,300 | 18,600 | 18,600 |

EXAMPLES 13 to 16 and COMPARATIVE EXAMPLE 1.

Preparation of Trimethylolmelamine.

378 g (3 moles) of melamine were added to 772 g (9 moles) of a 38% w/v formaldehyde solution and the resultant mixture was heated until a clear solution was obtained at about 70° C. On cooling to room temperature solid trimethylolmelamine precipitated. This was filtered and dried in an air-circulating oven at 60° C.

The following mixes were prepared:-

| Examples | Comp. Ex. 1 | 13 | 14 | 15 | 16 |
|---|---|---|---|---|---|
| Mixes | X | Y | Z | AA | AB |
| Aralkyl-phenol resin (As used in Example 1) | 80g. | 40g. | 32g. | 24g. | 16g. |
| Trimethylolmelamine (TMM) | — | 40g. | 48g. | 56g. | 64g. |
| Silica | 120g. | 120g. | 120g. | 120g. | 120g. |
| Magnesium oxide | 2.6g. | 2.6g. | 2.6g. | 2.6g. | 2.6g. |
| Zinc stearate | 3.2g. | 3.2g. | 3.2g. | 3.2g. | 3.2g. |
| Hexamine | 10g. | — | — | — | — |

The amount of trimethylolmelamine in X to AB is 0, 50, 60, 70 and 80% respectively, based on the total weight of aralkyl-phenol resin and trimethylolmelamine.

X was milled for 12 minutes at 120° C. The rest were milled for 2 minutes at 120° C.

Discs were moulded from each of the mixes using a pressure of 1,000 psi for 30 minutes at 175° C. The discs were post cured by heating at 90° C for 16 hours and from 140° to 200° C over 9 hours.

The comparative tracking index (CTI) was obtained for each disc according to BS.3781.

The results were as follows:

| Disc from mix. | CTI. |
|---|---|
| X | 150 |
| Y | 140 |
| Z | 250 |
| AA | 240 |
| AB | 400 |

Thus mixes Z and AA, having 60 and 70% respectively condensate give higher CTI values than Y with 50% TMM, but the CTI from mixture AB with 80% TMM is highest.

EXAMPLES 17 to 21 and COMPARATIVE EXAMPLE 2.

50% solutions of aralkylene-phenol resin as used in Example 1 and 50% solutions of trimethylolmelamine (TMM) Condensate B, each in 2-ethoxy ethanol, were mixed in different proportions to give a series of solutions AC – AJ. Each of the solutions was heated in an aluminium dish at 130° C for 30 minutes to evaporate the solvent and cause curing, and then heated at 250° C for two hours to complete the cure. Each specimen produced was weighed and then re-weighed after being heated for 24 hours at 250° C. The weight loss on the aging as a percentage of the original weight was as follows.

| Example | Solution | % resin | % TMM | % weight loss |
|---|---|---|---|---|
| Ex. 17 | AC | 50 | 50 | 4.0 |
| Ex. 18 | AD | 40 | 60 | 4.7 |
| Ex. 19 | AF | 30 | 70 | 6.2 |
| Ex. 20 | AG | 20 | 80 | 8.5 |
| Ex. 21 | AH | 10 | 90 | 9.3 |
| Comp. Ex. 2 | AJ | 0 | 100 | 9.8 |

These results and those of Examples 13 – 16 show that with 60 – 70% TMM the cured products have a moderate comparative tracking index and a moderate resistance to high temperature aging, while with 80 – 90% TMM the CTI is large but the resistance to aging is poorer.

We claim:

1. A resin composition which comprises (a) a resin having repeating units of the formula

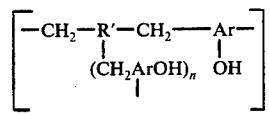

wherein R' is selected from the group consisting of divalent and trivalent aromatic hydrocarbyl groups and divalent and trivalent di(aromatic hydrocarbyl)oxy groups, and Ar is a residue formed by removal of two nuclear hydrogen atoms from a phenolic compound having 1-3 hydroxyl groups and at least two nuclear hydrogen atoms, and $n$ is 0 or 1, and (b) a condensate in an amount of 15%-35% by weight (based on the total weight of resin and condensate), said condensate being (i) derived from formaldehyde and melamine and (ii) capable of reacting with said resin (a) to form a cured product, and said resin composition being in an uncured or or partially cured form.

2. A composition according to claim 1 which contains 20-30% by weight of condensate.

3. A compound according to claim 2 wherein the nitrogenous compound is melamine.

4. A compound according to claim 2 wherein the condensate is trimethylol or hexamethylol melamine.

5. A composition according to claim 2 wherein the condensate is trimethylol melamine.

6. A composition according to claim 1 which comprises the resin dissolved in an organic solvent.

7. A composition according to claim 6 wherein the solvent is an alkoxyalkanol with 1 – 6 carbon atoms in the alkoxy group and 2 – 7 carbon atoms in the alkanol part, or a dialkyl ketone of 3 – 8 carbon atoms.

8. A composition according to claim 1 which comprises 0.5 – 100% by weight (based on the weight of resin) of an inorganic dispersing agent having at least one dimension less than 100 m μ and all dimensions less than 15 μ and stable to at least 150° C.

9. A composition according to claim 8 wherein the inorganic dispersing agent is silica of particle size 3 – 80 m μ.

10. A composition according to claim 1 wherein the resin has been prepared by reacting an aralkyl compound selected from aralkyl ether of formula R'(CH$_2$OR)$_a$ and an aralkyl halide of formula R'(CH$_2$X)$_a$ wherein R is an alkyl group of 1 – 5 carbon atoms, X is a halogen atoms selected from chlorine and bromine atoms and a is 2 or 3 with a molar excess of a phenolic compound as defined in claim 1.

11. A composition according to claim 10 wherein the resin (a) is prepared by reacting an aralkly diether with a phenolic compound.

12. A composition according to claim 11 wherein R' is mononuclear.

13. A composition according to claim 12 wherein the aralkyldiether is p-xylene glycol dimethyl ether.

14. A process of curing a resin as defined in claim 1 which comprises heating said resin with 15%-35% of a condensate as defined in claim 1.

15. A product obtained by curing a composition according to claim 1.

16. A composition according to claim 1 wherein said resin (a) is prepared by reacting an aralkyl diether with a phenolic compound.

17. A composition according to claim 2 wherein said resin (a) is prepared by reacting an aralkyl diether with a phenolic compound.

18. A composition according to claim 1 which contains about 25% by weight of said condensate.

19. A composition according to claim 18 wherein said resin (a) is prepared by reacting an aralkyldiether with a phenolic compound.

20. A composition according to claim 19 wherein the condensate is trimethylol melamine.

21. A compound according to claim 18 wherein the condensate is trimethylol or hexamethylol melamine.

* * * * *